United States Patent [19]

Barton

[11] Patent Number: 5,168,638

[45] Date of Patent: Dec. 8, 1992

[54] SENSOR FOR DETECTING THE LOCATION OF A DISCONTINUITY

[76] Inventor: David W. Barton, 4129 Chester St., Hudsonville, Mich. 49426

[21] Appl. No.: 512,763

[22] Filed: Apr. 20, 1990

[51] Int. Cl.$^5$ ............................................ G01D 21/00
[52] U.S. Cl. ........................................ 33/644; 33/520; 33/543; 33/561
[58] Field of Search ................... 33/543, 520, 644, 676, 33/608, 542, 556, 558, 559, 561

[56] References Cited

U.S. PATENT DOCUMENTS

| | | | |
|---|---|---|---|
| 3,093,909 | 6/1963 | Eisele | 33/543 |
| 3,798,779 | 3/1974 | Gluck | 33/558 |
| 3,882,608 | 5/1975 | Macklyn | 33/543 |
| 4,060,906 | 12/1977 | Heizmann | 33/520 |
| 4,211,014 | 7/1980 | Koltgen | 33/543 |
| 4,265,026 | 5/1981 | Meyer | 33/543 |
| 4,288,924 | 9/1981 | Mizuno et al. | 33/543 |
| 4,477,978 | 10/1984 | Azuma | 33/520 |
| 4,543,726 | 10/1985 | Lauer et al. | 33/644 |

FOREIGN PATENT DOCUMENTS 3121579 12/1982 Fed. Rep. of Germany ........ 33/608

Primary Examiner—Thomas B. Will
Attorney, Agent, or Firm—Varnum, Riddering, Schmidt & Howlett

[57] ABSTRACT

A sensor for detecting the location of a hole in a surface of a workpiece. The sensor comprises a sensing head having a probe adapted to engage the portion of the workpiece surface defining a hole. A housing supports the sensing head for lateral displacement in any direction from a longitudinal Z axis of the sensor in response to engagement of the hole-defining portion by the probe. A pair of displacement conversion members are supported in the housing for independent axial displacement along the Z axis corresponding in direction and magnitude to the lateral displacement of the sensing head along X and Y lateral axes, respectively. Sensing devices are disposed to respond to the axial displacement of each of the conversion members to generate a signal indicative thereof.

10 Claims, 8 Drawing Sheets

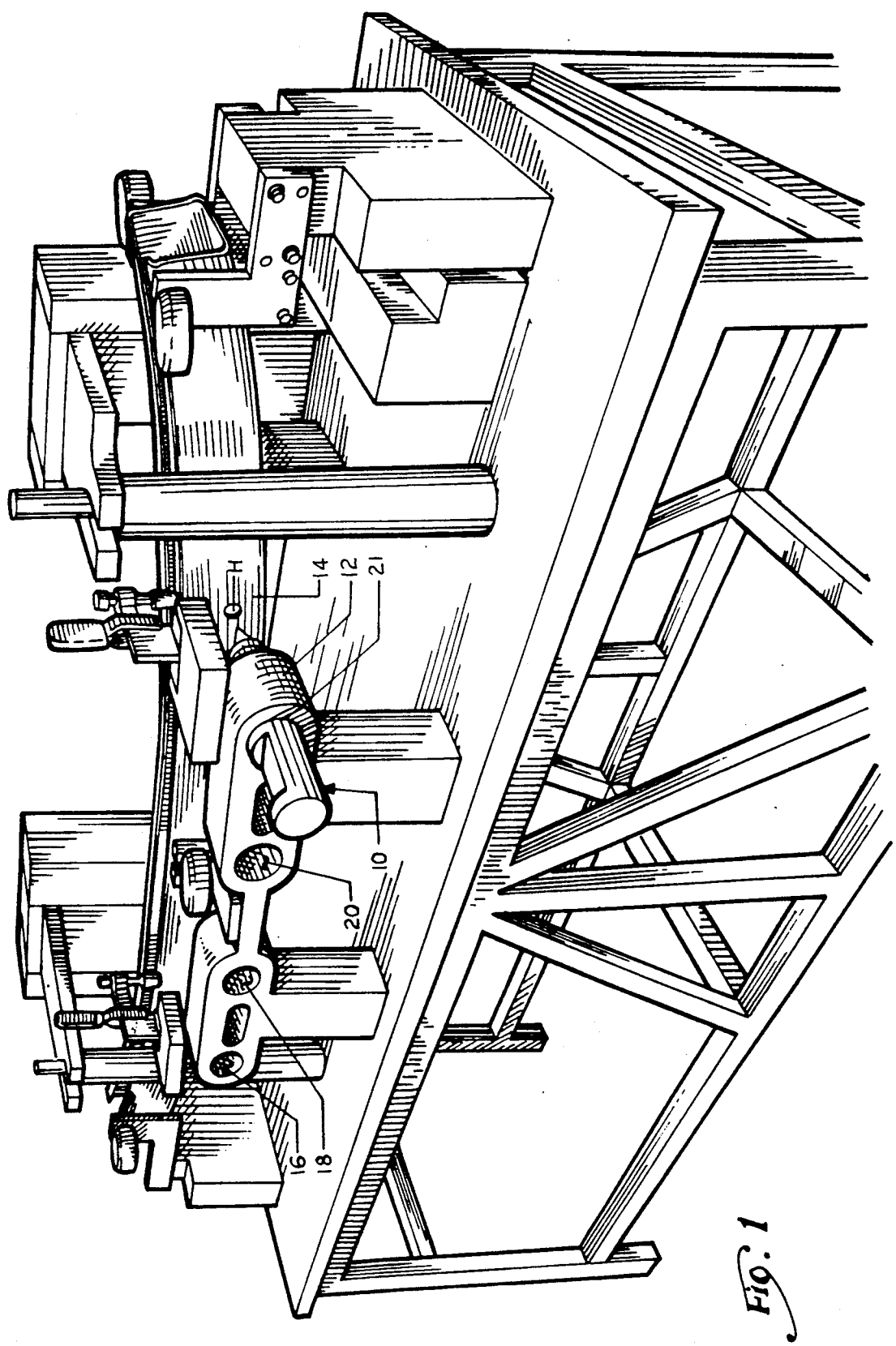

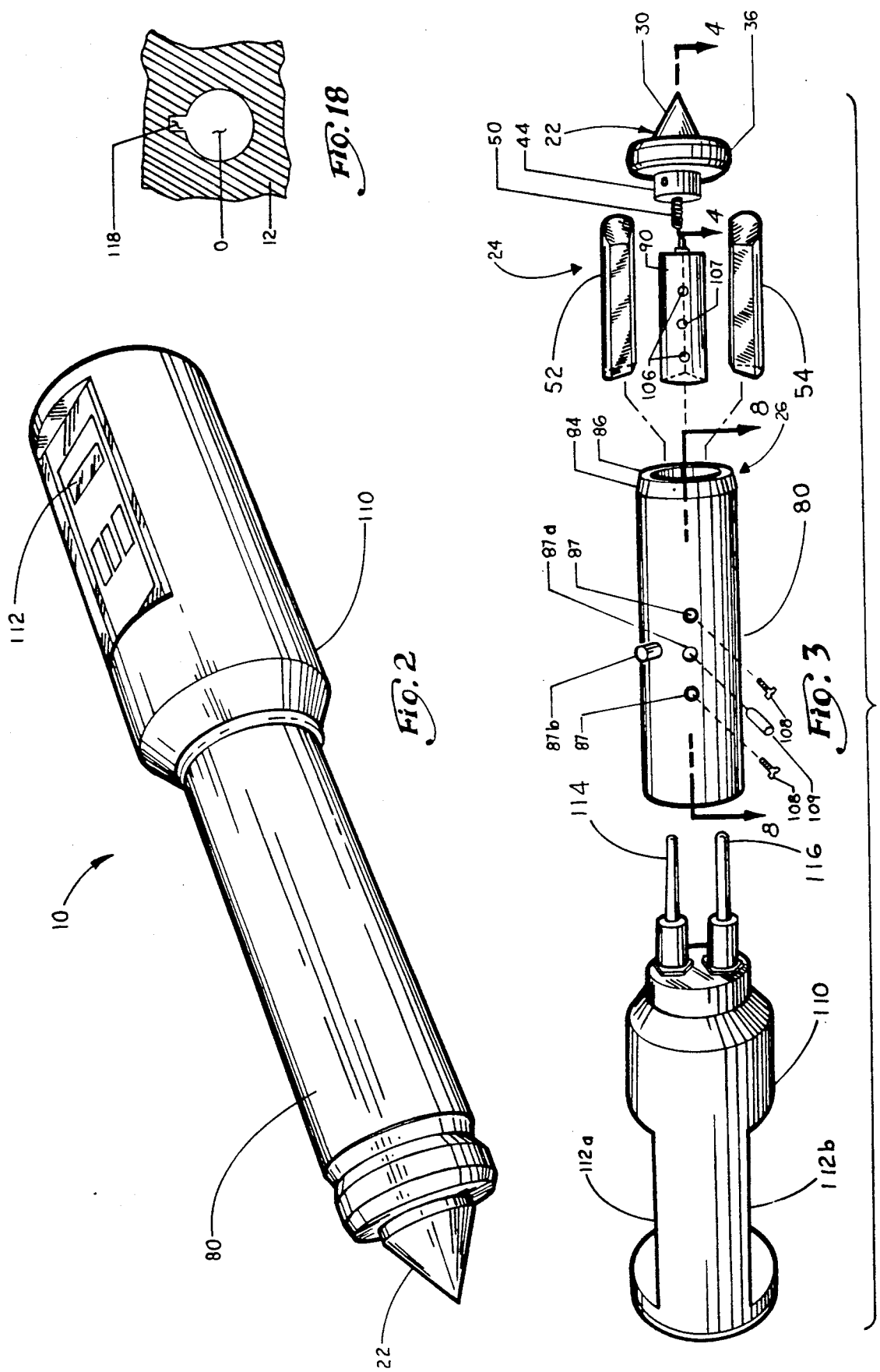

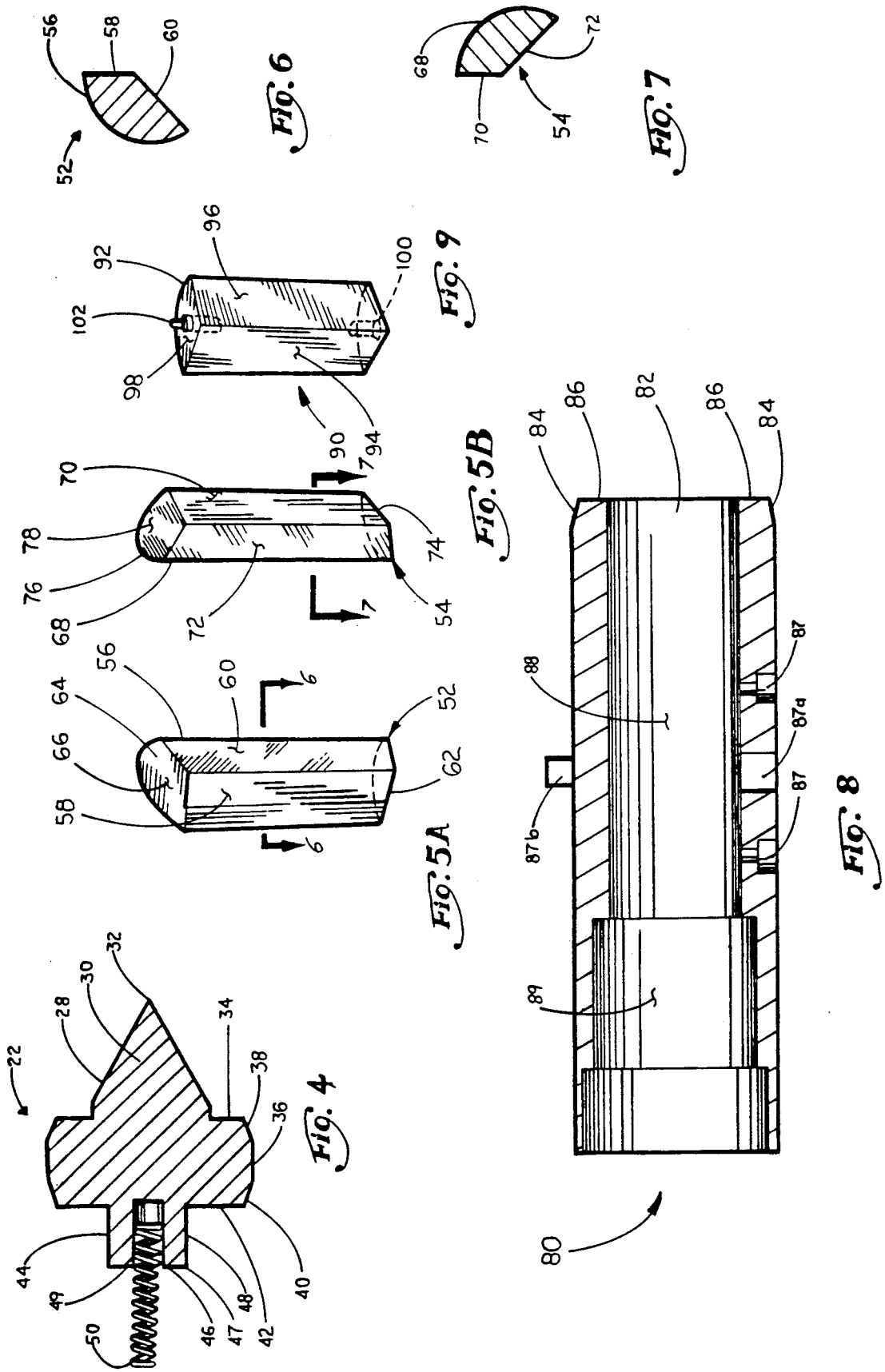

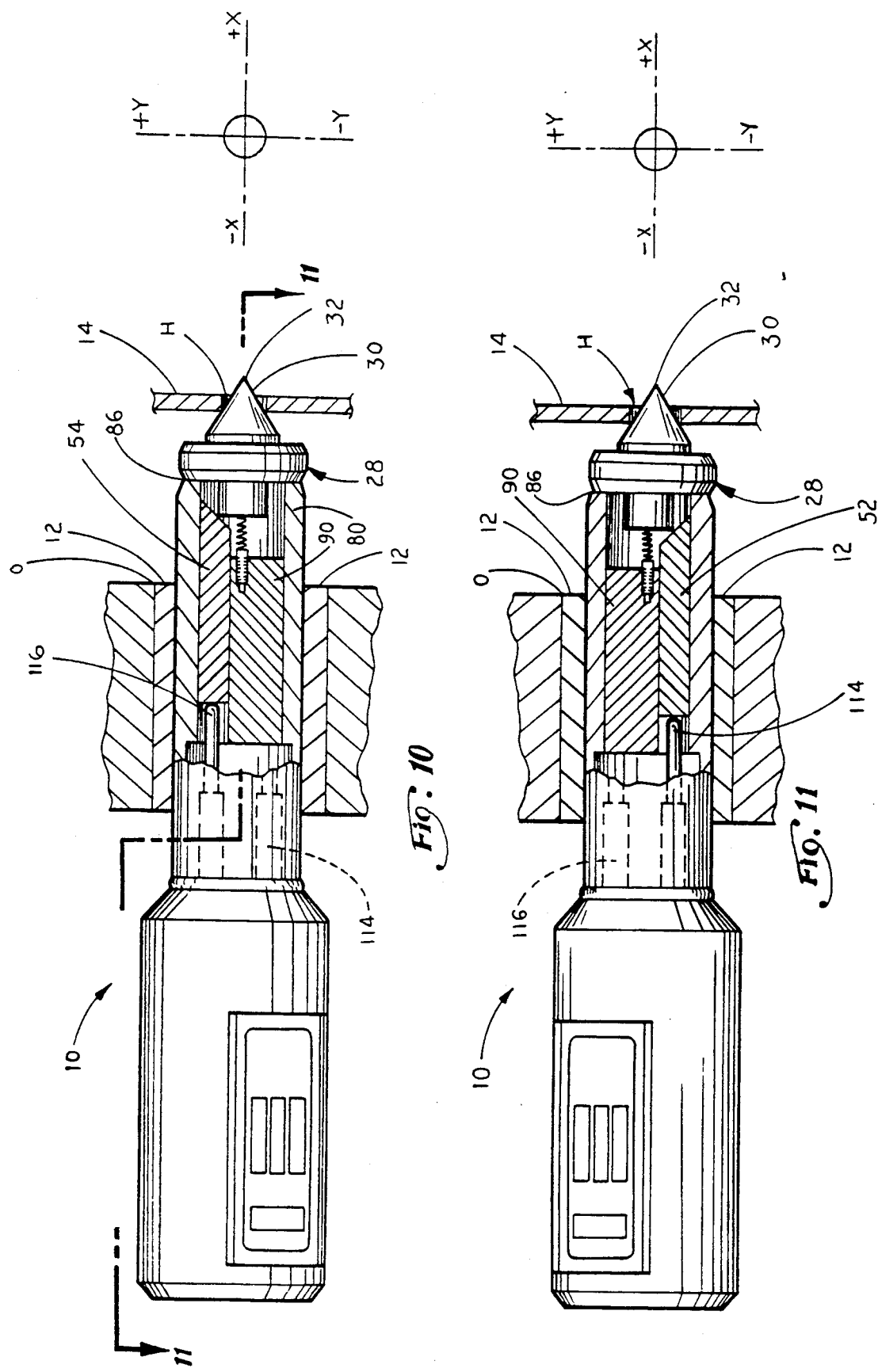

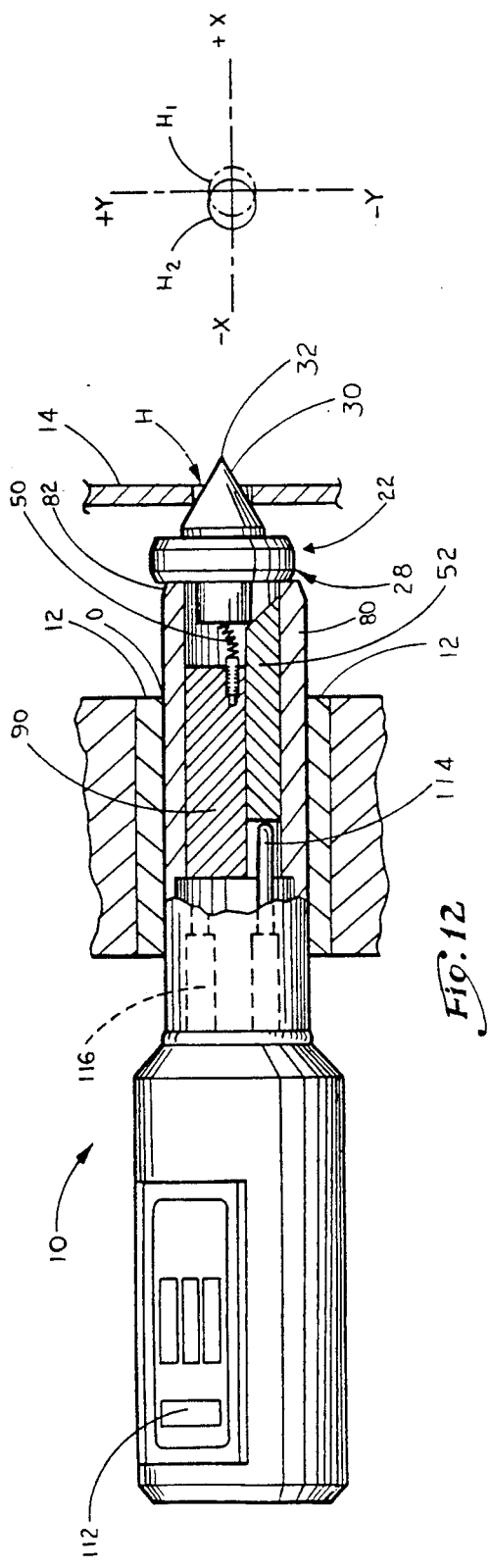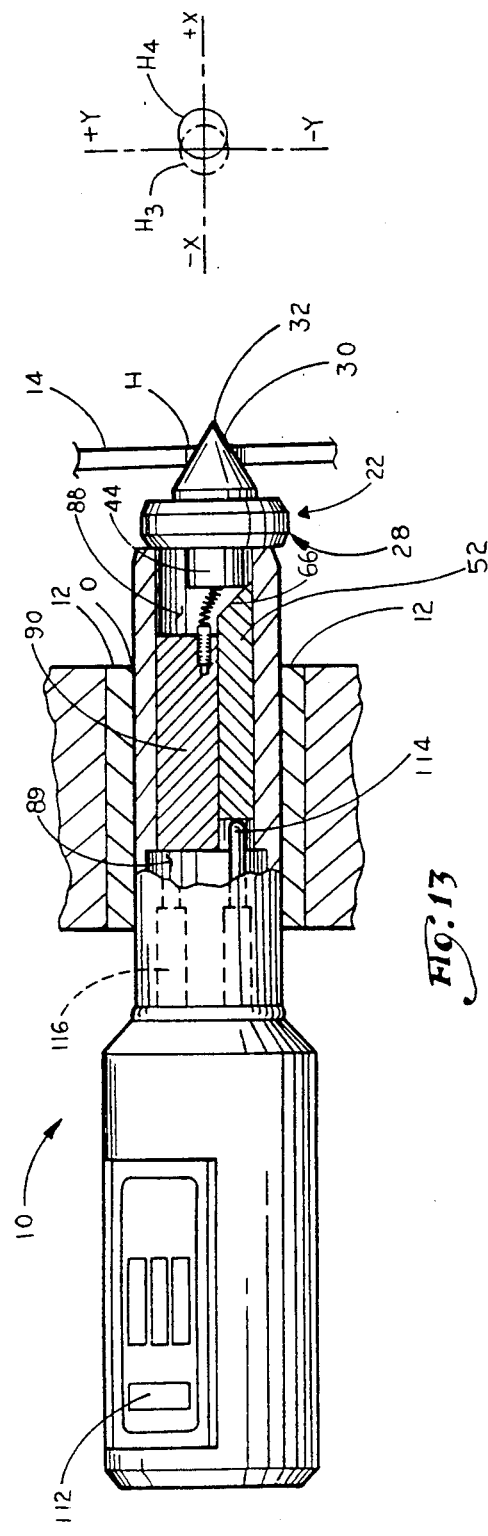

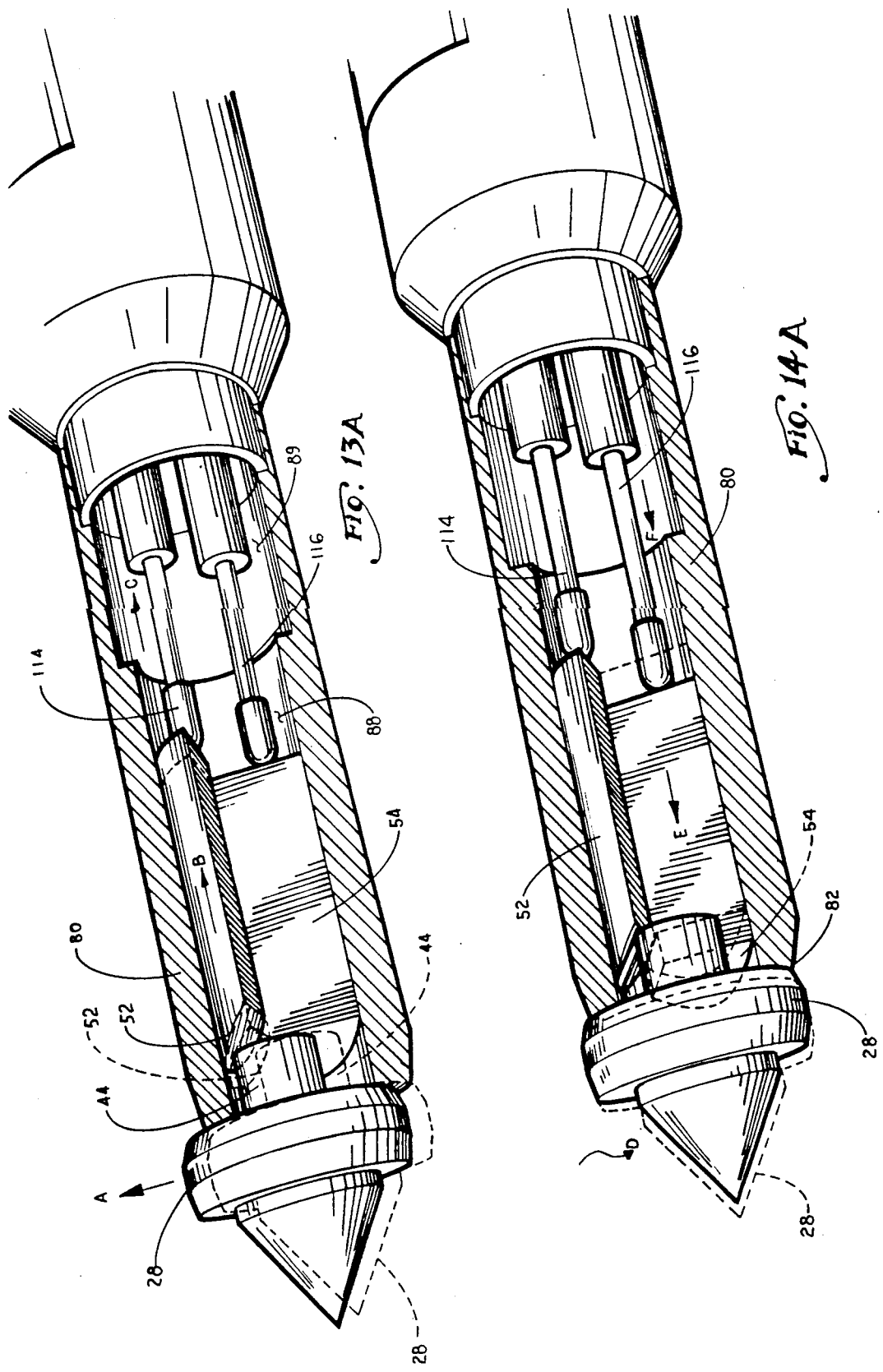

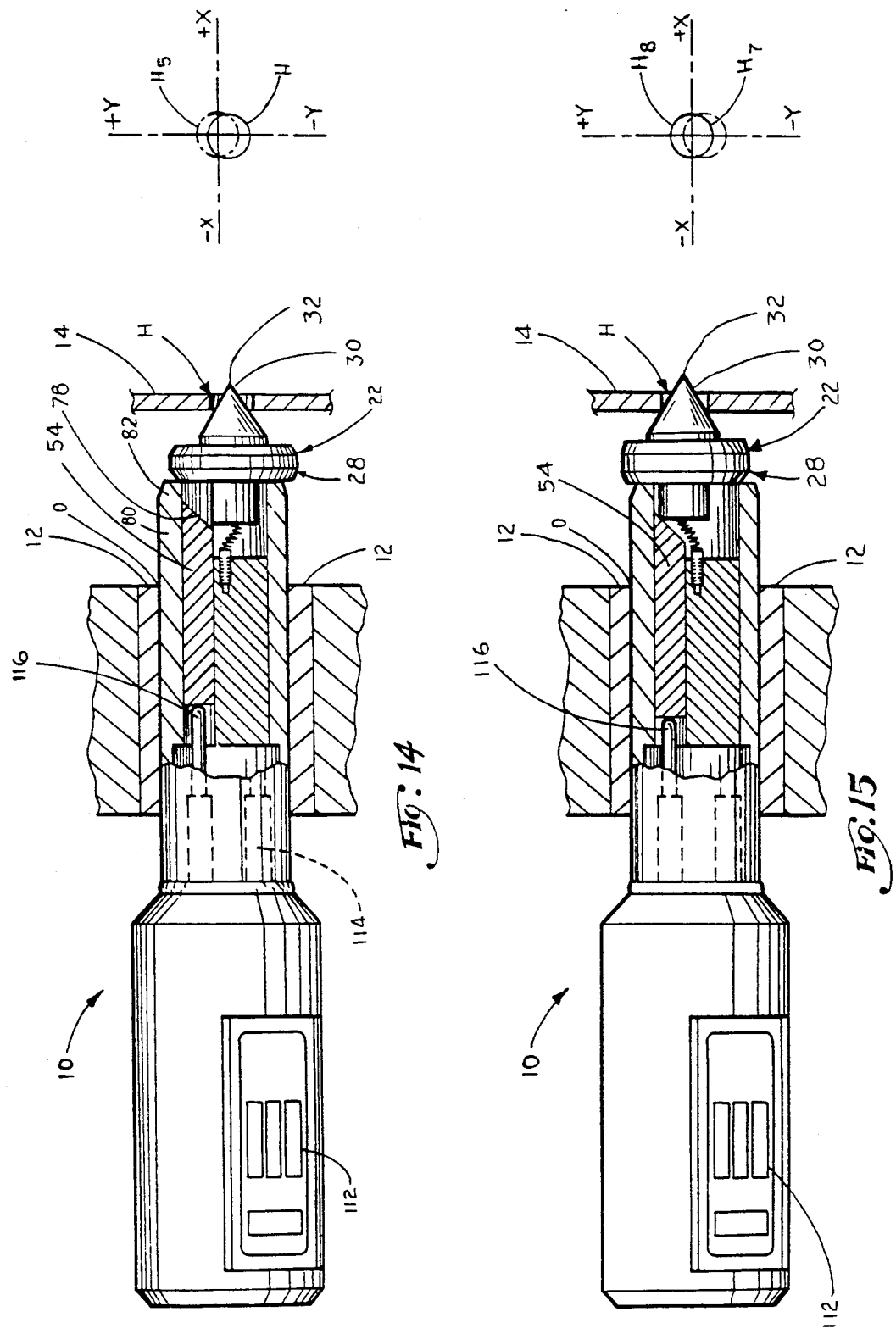

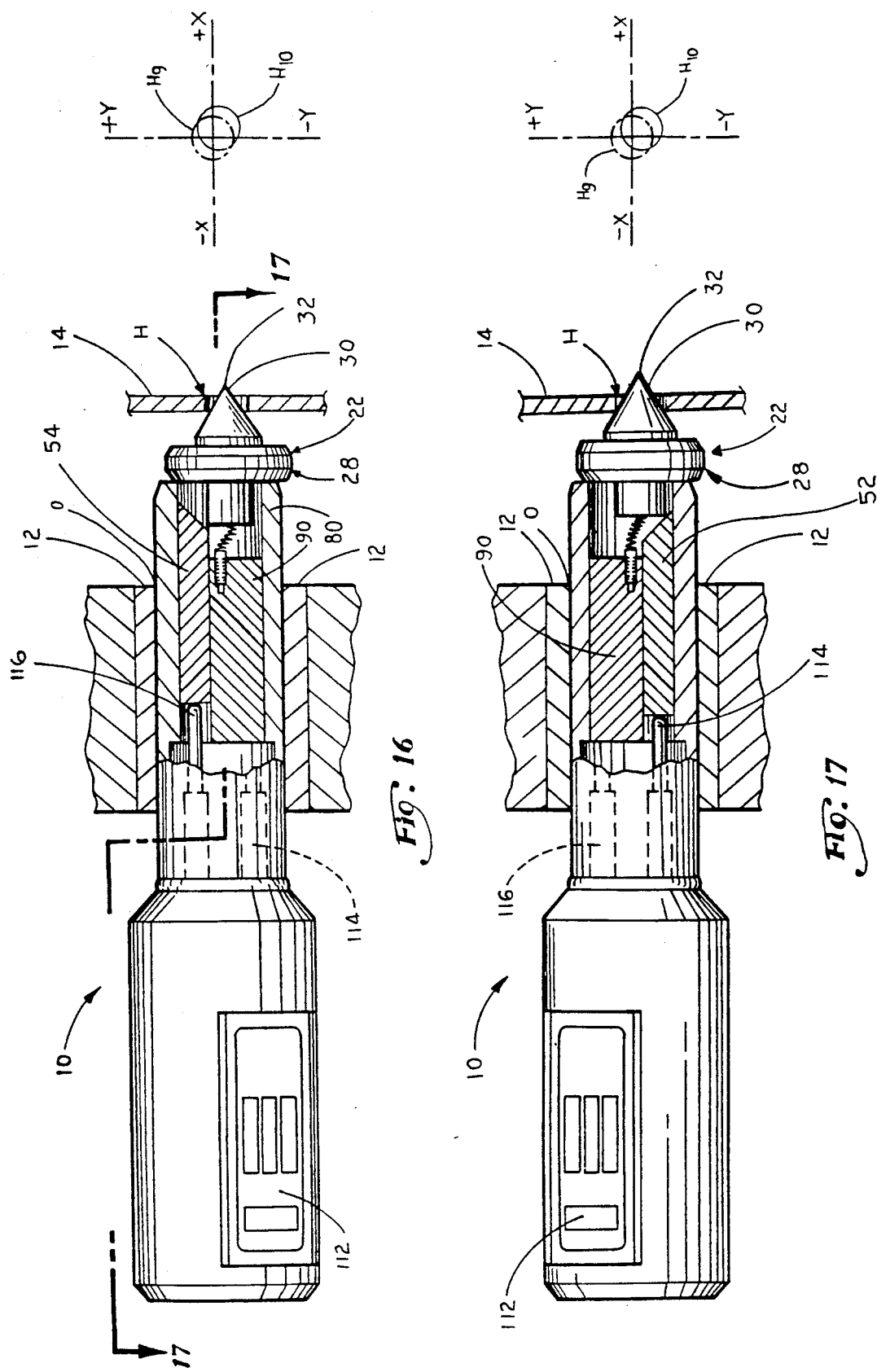

SENSOR FOR DETECTING THE LOCATION OF A DISCONTINUITY

BACKGROUND OF THE INVENTION

1. Field of the Invention

This invention relates generally to a statistical process control gaging apparatus and, more particularly, to a sensor for accurately determining the location and position of a discontinuity, such as a hole, in a workpiece.

2. Description of the Related Art

In many manufacturing situations involving the mass production of precision components whether they be formed of sheet or cast metal, wood, plastic or any other suitable material of construction, it is essential to accurately locate and position numerous holes in the component or workpiece. The holes may allow the workpiece to be mounted to a support surface or may enable an accessory component to be secured to the workpiece. If the workpiece is to function properly in a larger assembly or if the accessory component is to be securely mounted to the workpiece, it may be necessary to have several holes precisely located and positioned relative to the workpiece. The location and position of the holes may be determined with respect to an edge of the workpiece, a critical point on the workpiece, or another hole formed in the workpiece.

Historically, workpiece quality control procedures required time-consuming, laborious, manual calculations and measurements which demanded considerable skill and precision to perform. As a result, special dedicated gaging devices were developed. Such gages employ a fixture uniquely patterned after the workpiece. The fixture is formed with holes that are aligned with the holes formed in the workpiece. A pin is inserted into the hole formed in the fixture. If the workpiece hole has been formed at the desired location, the pin is simultaneously and readily received within the workpiece hole. If the hole has been formed at a location which falls outside the range of allowed tolerances, the workpiece hole is not sufficiently aligned with the fixture hole for the pin to be received within the workpiece hole. Thus, the gaging devices that are presently known merely function to indicate whether the workpiece hole has been formed at a location which is within the range of allowed tolerances. Hence, such devices are sometimes referred to as "go pins" because the workpiece hole is a "go" if the pin is received within the workpiece hole, indicating that the hole has been placed within allowed tolerances. On the other hand, the hole is a "no go" if the pin is not received within the workpiece hole, which indicates that the actual hole location is outside the range of allowed tolerances.

The presently known hole location devices lack the ability to provide variable data; that is, data describing not only the dimensional extent to which the hole has been displaced relative to the desired location but also the direction in which the displacement has occurred. Variable data is valuable in improving workpiece quality control procedures because the data may be stored, analyzed and displayed with a computerized data management system connected to the gage. The data may be used to detect the tendency for the hole location to drift or shift during a production run, for example, if the hole forming equipment becomes out of align, thereby indicating the need for equipment adjustment. A feedback loop connecting the hole location device with the hole forming equipment may provide for automatic correction of the forming equipment.

Variable data is also extremely useful in determining the location of a hole having non-uniform tolerances; that is, tolerances which vary with respect to an axis. Coordinate measurement machines are presently available for assisting in determining the location of the hole with respect to two axes. However, such machines are not only cumbersome and difficult to use, relative to "go pins", but are prohibitively expensive. Presently known gaging systems are not only elaborate, complex and costly but require a separate gage for each workpiece hole. For some manufacturers, the cost of providing multiple gages is prohibitive.

Thus, there is a need for a hole location apparatus that is adapted to provide variable data along two axes. As explained above, variable data enhances workpiece quality control procedures because separate dimensional and directional information can be collected along two axes for each hole. This not only refines the extent to which the hole location can be measured but can provide information regarding the tendency for the hole location to drift during a production run. It would also be advantageous if such devices were adapted to sequentially measure the position and location of multiple holes. Because workpieces often contain numerous holes, the position and location of which must be individually verified, it would be advantageous if a single fixture having multiple bores but adaptable for use with only a single gage could be constructed. In such a system, the gage would be receivable within each of the fixture bores and registerable with each of the workpiece holes to determine their location and position. In this arrangement, the workpiece would be mounted to the fixture and a single gage would be inserted within each bore sequentially to calculate the position and location of the associated workpiece hole. Thus, only a single gage rather than several gages would be required for collecting variable data along two axes for each workpiece, thereby resulting in a significant cost reduction for carrying out the quality control procedure.

SUMMARY OF THE INVENTION

The invention relates to a sensor for detecting the location of a discontinuity in a surface of a workpiece. The sensor comprises a sensing head having a cam surface adapted to engage a discontinuity in a workpiece surface and a housing supporting the sensing head for lateral displacement in any direction from a longitudinal Z axis of the sensor in response to engagement of a discontinuity by the cam surface. The sensor further comprises a pair of displacement conversion members supported in the housing for independent axial displacement along the Z axis corresponding in direction and magnitude to lateral displacement of the sensing head along X and Y lateral axes, respectively. The sensor also includes sensing means responsive to the axial displacement of each of the conversion members to generate a signal indicative thereof.

The invention also relates to a sensor for detecting the location of a hole in a surface of a workpiece. The sensor comprises a sensing head having a probe adapted to engage a portion of a workpiece surface defining a hole and a housing supporting the sensing head for lateral displacement in any direction from a longitudinal Z axis of the sensor in response to the engagement of a hole-defining portion by the probe. The sensor further comprises a pair of displacement conversion members supported in the housing for independent axial displacement along the Z axis corresponding in direction and magnitude to the lateral displacement of the sensing head along X and Y lateral axes, respectively. The sensor further comprises sensing means responsive to the axial displacement of each of the conversion members to generate a signal indicative thereof.

The displacement conversion members and the sensing means are adapted to cooperate to indicate the dimensional and directional offset of a hole-defining portion relative to a predetermined location.

The sensing head includes a rearwardly facing boss and the displacement conversion members have end surfaces that are engaged by the boss to effect the axial displacement of the conversion members in response to the lateral displacement of the sensing head.

The displacement conversion members are disposed in side-by-side relation and are positioned 90° out of phase with one another so that each conversion member is respectively associated with movement along an X or Y axis.

End surfaces of each displacement conversion member slope relative to the axial and transverse directions and are beveled and at an angle of 45° such that the lateral displacement of the sensing head is in a 1:1 ratio with the displacement of the displacement conversion members.

The displacement conversion members are received within a tubular housing and include arcuate surfaces that engage an interior surface of the tubular housing. The tubular housing further supports a mounting member that is fixedly secured to the housing and which engages side walls of the displacement conversion members to maintain the arcuate surfaces of the conversion members in contact with the interior surface of the tubular housing.

The sensing head has a rearwardly facing boss and the end surfaces of the displacement conversion members are engaged by the boss to effect the axial displacement of the conversion members in response to lateral displacement of the sensing head. The sensing head is constantly urged toward the longitudinal Z axis of the sensor by biasing means such as a spring that is attached to the boss and which has another end is fixed relative to the housing. The hole location sensor provides an apparatus for accurately determining the location and position of a hole that is formed in a workpiece and provides variable date along two axes regarding the hole location.

BRIEF DESCRIPTION OF THE DRAWINGS

The invention will now be described with reference to the accompanying drawings in which:

FIG. 1 is a perspective view of a workpiece mounted to a fixture utilizing a hole location apparatus according to the invention;

FIG. 2 is an enlarged perspective view of the hole location apparatus of FIG. 1;

FIG. 3 is an exploded perspective view of the hole location apparatus of FIGS. 1 and 2;

FIG. 4 is a sectional view taken along lines 4—4 of FIG. 3;

FIG. 5 is a perspective view of the first and second displaceable members of a displacement conversion means for a hole location apparatus according to the invention;

FIG. 6 is a sectional view taken along lines 6—6 of FIG. 5;

FIG. 7 is a sectional view taken along lines 7—7 of FIG. 5;

FIG. 8 is a sectional view taken along lines 8—8 of FIG. 3;

FIG. 9 is a perspective view of a probe mounting member for a hole location apparatus according to the invention;

FIG. 10 is a view partially in section of a hole location apparatus according to the invention and showing schematically the apparatus upon registration with a hole formed in a workpiece, the hole having been formed in the workpiece at the desired location;

FIG. 11 is a sectional view taken along lines 11—11 of FIG. 10;

FIG. 12 is a view partially in section showing schematically the hole location apparatus upon registration with a hole formed in a workpiece, the hole being displaced in a negative direction along the X-axis relative to the desired location;

FIG. 13 is a view partially in section showing schematically the hole location apparatus upon registration with a hole that is displaced in a positive direction along the X-axis relative to the desired location;

FIG. 13A is a perspective view, partially in section and partially broken away, further illustrating the condition of the hole location apparatus shown in FIG. 13;

FIG. 14 is a view partially in section showing schematically the hole location apparatus upon registration with a hole formed in a workpiece, the hole being displaced in a negative direction along the Y-axis relative to the desired location;

FIG. 14A is a perspective view, partially in section and partially broken away, further illustrating the condition of the hole location apparatus shown in FIG. 14;

FIG. 15 is a view partially in section showing schematically the hole location apparatus upon registration with a hole that is displaced in a positive direction along the Y-axis relative to the desired location;

FIG. 16 is a view partially in section showing schematically the hole location apparatus upon registration with a hole that is displaced in a positive direction along the X-axis and displaced in a negative direction along the Y-axis relative to the desired location;

FIG. 17 is a sectional view taken along lines 17—17 of FIG. 16; and

FIG. 18 is a cross-sectional view showing an opening formed in the fixture, the opening being adapted to receive a hole location apparatus according to the invention.

DETAILED DESCRIPTION OF THE PREFERRED EMBODIMENTS

Turning now to the drawings and in particular to FIGS. 1 to 3, an apparatus 10 for determining the location and position of a hole (sometimes referred to hereinafter as "hole location apparatus" or "hole location sensor") is shown in conjunction with a fixture 12 that mounts the apparatus and a workpiece 14. The fixture 12 includes a plurality of openings 16, 18, 20 and 21 formed therethrough. Each opening is adapted to separately receive a hole location apparatus 10. The hole location apparatus is shown particularly as being received in the opening 21. The fixture 12 and the workpiece 14 form no part of the invention's broader aspects and are illustrated principally for the purpose of describing a typical environment in which the hole location apparatus 10 may find use.

The workpiece 14 may comprise any article having holes formed therein, for example a component of sheet metal, cast metal, plastic, wood or other suitable material of construction and in which the position and location of the holes must be accurately determined in order to maintain the quality of the finished manufactured article (not shown separately in the drawings). For example, the workpiece holes may be provided for mounting the workpiece 14 to a support surface, for mounting an accessory component to the workpiece, or for incorporating the workpiece into a larger assembly. In any event, if the workpiece 14, the assembled component, or the finished assembly are to be commercially acceptable in their function and operation, it may be necessary to accurately and precisely control the location and position of the holes formed in the workpiece. A hole location apparatus 10 according to the invention determines the position and location of a hole formed in the workpiece 14 and compares the actual position and location against reference values to determine whether the actual position and location of the hole are within allowed tolerances. A hole location apparatus according to the invention is also adapted to collect, store and analyze variable data pertaining to the position and location of the holes for statistical process control purposes.

As explained more fully hereinbelow, the workpiece 14 is mounted to the fixture 12 and aligned relative thereto with respect to predetermined reference points. The openings 16, 18, 20 and 21 formed in the fixture 12 are axially aligned with the holes in the workpiece 14 to facilitate determining the position and location of the holes. Only one hole, H, which is aligned with the fixture opening 21 and the apparatus 10 is shown in FIG. 1. In those hole location gauges that are presently known, each opening 16, 18, 20 and 21 in the fixture 12 is adapted to receive a separate and individual gauge, which gauge registers with the workpiece hole that is aligned with the respective fixture opening. This is an extremely costly arrangement in that numerous hole location gauges must be provided, one gauge being needed for each hole, the position and location of which must be determined. However, as explained more fully hereinbelow, the hole location apparatus 10 according to the invention is adapted for use in each of the openings 16, 18, 20 and 21 sequentially. Therefore, only a single hole location apparatus 10 may be required, the apparatus being separately receivable in each of the fixture openings 16, 18, 20 and 21.

Moreover, those hole location devices that are presently known lack the capacity to provide variable data describing the dimensional extent and direction of displacement of the workpiece hole relative to the predetermined reference values. Variable data capabilities enhance the sophistication of workpiece quality control procedures. The hole location apparatus according to the invention is adapted to provide variable data.

The hole location apparatus 10 according to the invention comprises means for determining the position and location of a hole in a workpiece and means for indicating the relative position and location of the hole with respect to a predetermined reference value. The means for determining the position and location of a hole (sometimes referred to hereinafter as "position determining means") comprises a laterally displaceable probe means 22, means 24 for converting the lateral displacement of the probe to a longitudinal displacement (referred to sometimes hereinafter as "displacement conversion means"), and means 26 for housing and mounting the probe means 22 and the displacement conversion means 24 (sometimes referred to hereinafter as "housing means" and/or "mounting means").

The laterally displaceable probe 22 is best shown in FIGS. 3 and 4 and includes a probe head or sensing head 28 having a conical tip or probe 30 that circumferentially tapers at an angle of approximately 30° to a point 32. The length, diameter and degree of taper of the tip 30 may be varied, the significance of which is explained more fully hereinbelow. The probe head 28 is mounted to a lower surface 34 of a substantially circular base 36, edge portions 38 and 40 of which may be beveled, for example at a 15° angle. An upper surface 42 of the base 36 includes a boss 44 centrally formed thereon. The boss 44 includes an aperture 46 formed therein which is axially aligned with respect to the probe head point 32. A biasing means such as a spring 50 is mounted within the aperture 46 by a pin 47 or other appropriate fastener. The boss 44 further includes a circumferential wall 48 and a top wall 49. Preferably, the top wall 49 and the upper surface 42 of the base 36 are parallel to each other. Preferably, the circumferential wall 48 is perpendicular to the upper surface 42 of the base 36. The circumferential wall 48 is also, in the preferred embodiment, concentric with the probe head 38.

As best shown in FIGS. 3, 5, 6 and 7, the displacement conversion means comprises, in part, a pair of first and second displaceable members or displacement conversion members 52, 54, respectively. The first displaceable member 52 (FIGS. 5 and 6) is an elongated element having a radiused exterior surface 56, an end wall 58, and an inwardly facing surface or side wall 60 that is oriented at a 45° angle with respect to the end wall 58. The first displaceable member 52 further includes an upper end 62 that is ground perpendicular relative to the longitudinal axis of the displaceable member and a lower end 64 that is provided with a beveled surface 66 that slopes downwardly from the radiused exterior surface 56 toward the end wall 58 and the inwardly facing surface 60 at an angle of 45°.

The second displaceable member 54 (FIGS. 5 and 7) is a mirror image of the first displaceable member 52 and includes a radiused exterior surface 68, an end wall 70, and an inwardly facing surface or side wall 72 that is oriented at a 45° angle with respect to the end wall. An upper end 74 of the second displaceable member 54 is ground perpendicular to the longitudinal axis therefor and a lower end 76 includes a beveled surface 78 that slopes downwardly from the radiused exterior surface 68 toward the end wall 70 and the inwardly facing surface 72 at an angle of 45°.

As best shown in FIG. 8, the means for mounting and housing the laterally displaceable probe 22 and the displacement conversion means 24 includes, in part, an elongated, hollow, cylindrical, tubular housing, sleeve or shaft 80 having an outside diameter that is precision ground to a predetermined dimension although a lower end 82 of the sleeve may be slightly tapered as shown at 84. A lower end wall 86 of the sleeve 80 is precision ground so as to be perpendicular to the longitudinal axis of the sleeve. The sleeve 80 may be provided with a pair of openings 87 formed therethrough and an aperture 87a. Further, the exterior of the sleeve 80 may be provided with an outwardly projecting pin 87b circumferentially offset from the aperture 87a by 45°.

The hollow interior of the sleeve or shaft 80 includes a lower, first tubular chamber 88 and an upper, second tubular chamber 89. The first chamber 88 has a precision ground inside diameter that is slightly greater than the diameter defined by the arcs of the radiused exterior surfaces 56 and 68 of, respectively, the first and second displaceable members 52, 54, the significance of which is explained more fully hereinbelow. The first chamber 88 is adapted to receive the first and second displaceable members 52, 54. The second chamber 89 is bored to a diameter greater than the diameter of the first chamber 88 and is adapted to receive sensors associated with the position indicating means, as explained more fully hereinbelow.

The mounting means further includes a probe mounting member 90 which is best shown in FIGS. 3 and 9. The probe mounting member 90 includes a radiused exterior surface 92 having an arc that is substantially similar to the arc of the radiused exterior surfaces 56 and 68 of, respectively, the first and second displaceable members 52, 54. The probe mounting member 90 further includes a pair of side walls 94, 96 that are oriented in a direction substantially normal to each other, and opposite end walls 98, 100. The end wall 98 includes an outwardly extending pin 102. The radiused exterior surface 92 is similarly provided with a pair of bores 106 and an opening 107.

As best shown in FIG. 2, the position indicator (sometimes referred to hereinafter as position indicating means) includes a housing 110 that is adapted to receive and contain a digital electronics package (not shown in the drawings) and a visual display 112 therefor. The housing 110 may be formed in complementary halves that are secured together with screws or the like. As explained more fully hereinbelow, the position indicating means is adapted to sense or measure the extent to which the displaceable members 52, 54 are displaced and then convert that displacement into a digital signal that is displayed for interpretation by a user. The displayed information may be collected, stored and analyzed by a data management system (not shown in the drawings). A suitable example of a position indicating means having these characteristics is a Mitutoyo model IDU25E indicator which is manufactured by Mitutoyo Corporation, Tokyo, Japan and which is distributed in the United States by MTI Corp., Detroit Regional Office of Detroit, Mich. As shown in FIG. 3, the position indicating means includes a pair of sensors 114, 116 which, as explained more fully hereinbelow, are adapted to be received within the second chamber 89 of the sleeve 80 to detect and measure the displacement of the displaceable members 52, 54.

In assembly, the first and second displaceable members 52, 54 are slidably received within the interior of the sleeve or shaft 80. The radiused exterior walls 56, 68 bear against an inside surface of the hollow interior of the sleeve 80 and the respective end walls 58, 70 abut or are closely adjacent. The beveled surfaces 66, 78 are oriented to be adjacent to the lower end wall 86 of the sleeve 80. The laterally displaceable probe 22 is secured to the probe mounting member 90 by securing the spring 50 within the aperture 46 of the boss 44 of the probe 22 and within the aperture 102 formed in the lower end wall 98 of the probe mounting member. The probe mounting member 90 is received within the hollow interior of the sleeve or shaft 80 such that the radiused exterior surface 92 bears against the interior wall of the hollow interior of the sleeve and further such that the side wall 94 abuts or is closely adjacent to the inwardly facing surface or sidewall 60 of the first displaceable member 52. Similarly, the probe mounting member side wall 96 abuts or is closely adjacent to the inwardly facing surface or side wall 72 of the second displaceable member 54.

The probe mounting member 90 is fixedly secured to the sleeve 80 by screws or other appropriate mechanical fasteners 108 (FIG. 3) that are received within the bores 106 of the probe mounting member exterior surface 92 and the openings 87 in the sleeve. The probe mounting member 90 is further secured to the sleeve 80 by a press fit dowel 109 that is received in the sleeve aperture 87a and the opening 107 formed in the mounting member radiused exterior surface 92. The dowel 109 radially locates the mounting member 90 with considerable precision and, as a result, the first and second displaceable members 52 and 54. The upper surface 42 of the probe base 36 bears against the lower end wall 86 of the sleeve 80, the respective surfaces having been precision ground to provide a low friction interface.

Thus, the beveled end surfaces 66, 78 of, respectively, the first and second displaceable members 52, 54 are maintained 90° out of phase with one another and constantly engage the boss 44. The probe mounting member 90 engages the displaceable members 52, 54 to maintain contact between the radiused exterior surfaces 56, 68 and the interior surface of the sleeve or shaft 80. The probe mounting member 90 maintains the first and second displaceable members 52, 54 in circumferentially spaced relation and prevents circumferential movement of the members relative to the sleeve or shaft 80.

The probe base upper surface 42 is oriented substantially perpendicular to the longitudinal axis of the sleeve 80. The position indicating means is mounted to the sleeve 80 by inserting a lower portion of the housing 110 into the second chamber 89. A retaining ring or the like (not shown in the drawings) may be used to further secure the position indicating means to the sleeve 80. The sensors 114, 116 are similarly received within the second chamber 89 and are closely adjacent to, respectively, the first and second displaceable members 52, 54, the significance of which is explained more fully hereinbelow. A second sleeve (not shown in the drawings) may be secured within the second chamber 89 and adapted to receive the sensors 114, 116. The second sleeve functions principally to enhance the structural integrity of the hole location apparatus.

The operation of the hole location apparatus 10 is best shown in FIGS. 10 to 17. Referring first to FIGS. 10 and 11, the hole location apparatus 10 is shown as being received in an opening formed in a fixture for a workpiece. The opening, designated generally by the reference character O, may be any of the openings 16, 18, 20 or 21 formed in the fixture 12 and adapted to receive a hole location apparatus according to the invention to determine whether holes formed in the workpiece have been positioned within allowed tolerances. The fixture 12, as described above, has been uniquely patterned after the workpiece 14. It will be understood that the fixture 12 forms no part of the invention's broader aspects and is illustrated principally for the purpose of describing the function of the hole location apparatus 10. The inside diameter of the opening O is precision machined bored so as to provide a snug but slidable fit with the sleeve or shaft 80 of the hole location apparatus 10.

As best shown in FIG. 18, the fixture opening O includes a square offset slot 118 which is adapted to receive the pin 87b projecting from the exterior surface of the sleeve or shaft 80. The cooperation of the pin 87b and the slot 118 aligns the hole location apparatus 10 relative to the fixture 12 and the workpiece 14 so that the sensors 114, 116 are properly oriented with respect to X and Y lateral axes for the workpiece, as will become more apparent below. Alternatively, the fixture opening O can be provided with a precision machined bushing (not shown in the drawings) that includes a slot similar to the slot 118 for receiving the pin 87b.

Also shown in FIGS. 10 and 11 is the workpiece 14 having the hole H formed therein. The workpiece 14 forms no part of the invention's broader aspects and is illustrated principally for the purpose of describing the operation of the hole location apparatus 10. The hole H may be any hole formed in the workpiece 14, the location and position of which must be verified by the apparatus 10. As explained hereinabove, the openings 16, 18, 20 and 21 formed in the fixture 12 are positioned such that they are aligned with the associated holes in the workpiece 14. Thus, the hole H in the workpiece 14 is aligned with the opening O in the fixture 12 if the hole H has been formed in the appropriate location. However, it will be understood if the hole H has been formed in a location other than the desired location, then the hole H and the opening O are not aligned.

In operation, the hole location apparatus 10 is received within the opening O formed in the fixture 12 and the conical tip 30 of the probe head 28 is registered with the hole H. FIGS. 10 and 11 schematically illustrate the situation in which the hole H is formed at exactly the desired location in the workpiece 14. Thus, the hole H and the opening O are aligned. As shown in FIGS. 10 and 11, the point 32 of the conical tip 30 and the probe head 28 are substantially centered with respect to the lower end wall 86 of the sleeve 80 and are substantially aligned with the longitudinal or Z axis of the sleeve (not shown separately in the drawings). The probe head 28 is urged to the aligned position by the biasing force of the spring 50. The first and second displaceable members 52, 54, respectively, have not been displaced from their initial position, the significance of which is explained more fully hereinbelow.

Although the conical tip is tapered at an angle of 30°, it will be understood that the tip may be tapered at other angles such as 15° or 45°. If the tip is provided with a more acute taper, the tip tends to seat more securely within the workpiece hole and is less subject to undesired lateral shifting movement. In some situations, for example where it is desired to determine the position of a hole having a counterboared portion, it may be necessary to provide a taper of approximately 15° so that the conical tip 30 seats only within the hole without engaging the sidewalls for the counterbore. The specific degree of taper for the conical tip 30 will vary with the particular requirements of each situation.

Alternatively, the probe head 28 can be provided with a flat end surface rather than a tip 32, which end surface includes a reverse angle or a tapered depression that is adapted to receive a stud or the like, the stud being the measurable object rather than the workpiece hole.

Thus, it can be seen that the invention generally relates to a sensor or apparatus for detecting the location of a discontinuity, for example, a hole or a stud, in a workpiece. The sensor comprises a probe head or sensing head that has a cam surface such as the conical tip or the tapered depression which is a adapted to engage the discontinuity. As the cam surface engages the discontinuity, the sensing head is laterally displaced, thereby causing the displacement conversion members to be axially displaced along the longitudinal Z axis of the sensor.

FIG. 12 is a view partially in section showing schematically the hole location apparatus 10 upon registration with a hole which is displaced in a negative direction along the X-axis relative to the desired location. In FIG. 12, the reference $H_1$ designates schematically the desired location of the hole in the workpiece 14 whereas the reference $H_2$ designates schematically the actual location of the hole in the workpiece, the actual location of the hole being displaced in a negative direction along the X-axis relative to the desired location. The orientations of the X-axis and the Y-axis with respect to the hole location apparatus 10, the fixture 12, and the workpiece 14 are arbitrary although are, of course, at right angles with respect to each other and are illustrated in the drawings principally for the purpose of facilitating understanding of the operation of the hole location apparatus. Because the actual hole position $H_2$ does not correspond exactly with the desired hole position $H_1$, the hole $H_2$ is not aligned with the opening O in the fixture 12. Thus, upon registration of the hole location apparatus 10 with the hole $H_2$, the probe head 28 is laterally displaced in a negative direction along the X-axis, as can be seen most clearly by comparing the position of the probe head in FIG. 12 with its position in FIG 11.

The probe head 28 is urged to the displaced position of FIG. 12 against the restoring force of the spring 50 which secures the probe head to the fixed and immovable probe mounting member 90. As the probe head 28 is displaced to the position illustrated in FIG. 12, the first displaceable member 52 is biased by the spring-loaded sensor 114 in a direction toward the lower end 82 of the sleeve 80. Because the lower end 64 of the first displaceable member 52 includes a surface 66 which has been beveled at a 45° angle, the lateral or horizontal displacement of the probe head 28 is translated into an equal displacement in the vertical direction by the displacement conversion means 24. That is, the distance which the first displaceable member 52 is vertically displaced is dimensionally equivalent to the lateral or horizontal displacement of the probe head 28. The vertical displacement sustained by the first displaceable member 52 is interpreted by the sensor 114 and the associated digital electronics package, and is displayed by the visual display 112.

The actual mechanism by which the sensor 114 determines and interprets the displacement of the first displaceable member 52 and its subsequent display in the visual display 112 occurs in a well-known manner and need not be further explained. The visual display 112 may be adapted to display the extent of the displacement of the displaceable member 52 in an easily interpreted format and may further be adapted to indicate whether the displacement has taken place in a positive or negative direction along the relevant axis. Thus, the laterally displaceable probe means 22 and the displacement conversion means 24 cooperate to provide means for determining the position of the hole formed in the workpiece 14.

The upper surface 42 of the base 36 of the probe 22 and the lower end wall 86 of the sleeve 80 are preferably precision ground to provide a low-friction interface between the probe head 28 and the sleeve 80 which facilitates lateral displacement of the probe means 22 upon registration of the hole location apparatus 10 with the workpiece hole. Because the hole $H_2$ in FIG. 12 is displaced only in a negative direction along the X-axis, the second displaceable member 54 (not shown separately in FIG. 12) has not been displaced with respect to its position in FIG. 11.

In the preferred embodiment, the displaceable member end surfaces are beveled at a 45° angle such that the lateral or horizontal displacement of the probe head is translated into an equal displacement in the vertical direction. However, it will be understood that the end surfaces may be beveled at angles other than 45° in which case the extent of vertical displacement will be at a ratio of other than 1:1 relative to the horizontal displacement of the probe head. In any event, the relative displacement of the displaceable members and the probe head are determinable through the application of well known principles of trigonometry. For example, if the end surfaces are beveled at a 60° angle, the extent to which the displaceable members are vertically displaced will be twice that of the horizontal displacement, which may be a useful feature if particularly exacting measurements are required. Of course, the actual horizontal displacement of the probe head can be displayed for the user by provision of the appropriate circuitry in the electronics package. On the other hand, if the end surfaces are beveled to an angle of 30°, the vertical displacement of the displaceable members will be one half the extent of the probe horizontal displacement.

FIG. 13 illustrates the hole location apparatus 10 upon registration with a hole in the workpiece 14, the hole having been displaced in a positive direction along the X-axis with respect to the desired location. The reference $H_3$ illustrates the desired position of the hole in the workpiece 14 and the reference $H_4$ designates the actual position of the hole, the actual position being displaced in a positive direction along the X-axis with respect to the desired location. Because the actual location $H_4$ is displaced from the desired location $H_3$, the workpiece hole and the opening O in the fixture 12 are not aligned. Thus, when the hole location apparatus 10 is received within the fixture opening O, the probe 22 is laterally displaced relative to the orientation illustrated in FIGS. 10 and 11.

As the probe head 28 is laterally or horizontally displaced, the boss 44 bears against the beveled surface 66 of the first displaceable member 52 thereby shifting it vertically in a direction toward the first and second chambers 88, 89 of the sleeve 80. The end surface 58 of the first displaceable member 52 bears against the spring-loaded sensor 114 which determines the extent of the displacement of the first displaceable member. Because the surface 66 is beveled at an angle of 45°, the lateral or horizontal displacement of the probe head 28 is converted by the displacement conversion means 24 to an equivalent displacement in the vertical direction. The extent of the displacement is determined by the sensor 114, is converted by the digital electronics package, and is displayed by the visual display 112.

FIG. 13A is a perspective, partially in section, partially broken away view further illustrating the condition of the hole location apparatus 10 shown in FIG. 13. The arrow identified by the reference character A indicates the horizontal or lateral displacement of the probe from the position shown in interrupted lines to the positions shown in solid lines. Similarly the arrow identified by the reference character B indicates the vertical displacement of the first displaceable member 52 toward the first and second chambers 88 and 89 for a distance equivalent to the horizontal displacement of the probe. The original position of the first displaceable member 52 is shown in interrupted lines; the displaced position shown in solid lines. The arrow identified by the reference character C shows the direction in which the first sensor 114 is displaced in response to the movement of the first displaceable member 52. The probe mounting member 90 has been removed to more clearly show the second displaceable member 54 which has not been displaced because the workpiece hole is displaced only along the X-axis from the desired location and not along the Y-axis FIGS. 14 and 15 are similar to FIG. 10 and illustrate the hole location apparatus 10 when registered with a hole formed in the workpiece 14, the hole having been displaced either in a negative or positive direction along the Y-axis, as opposed to the X-axis. That is, in FIG. 14, the actual position $H_6$ of the hole in the workpiece 14 is displaced in a negative direction along the Y-axis with respect to the desired location $H_5$ of the hole. Therefore, when the hole location apparatus lo is registered with the opening O in the fixture 12 and the workpiece hole, the probe means 22 is laterally displaced. The second displaceable member 54 is shifted in a direction toward the lower end 82 of the sleeve or shaft 80 by the spring-loaded sensor 116. Because the surface 78 at the lower end 76 of the second displaceable member 54 is beveled at an angle of 45°, the lateral displacement of the probe means 22 is equivalently converted to a displacement of the second displaceable member 54 in the vertical direction. The sensor 116 determines the extent of the displacement of the second displaceable member 54, the information being converted by the digital electronics package and displayed by the visual display 112.

FIG. 14A is similar to FIG. 13A and further illustrates the condition of the hole location apparatus shown in FIG. 14. The arrow identified by the reference character D indicates the movement of the probe head from the position shown in interrupted lines in a direction toward one viewing the drawing to the position shown in solid lines. Similarly, the arrow designated by the reference character E shows the vertical displacement of the member 54 toward the lower end 82 of the sleeve 80. The member 54 has been displaced from the interrupted line position to the solid line position. The probe mounting member 90 has been removed to more clearly show that the first displaceable member has not sustained any movement. The arrow designated by the reference character F shows the corresponding movement of the sensor 116.

Similarly, FIG. 15 illustrates the situation in which the hole location apparatus 10 is registered with a workpiece hole that has been displaced in a positive direction along the Y-axis relative to the desired location. Thus, the reference $H_7$ indicates the desired position of the workpiece hole while the reference $H_8$ indicates the actual position of the hole, the actual position being displaced in a positive direction along the Y-axis relative to the desired location. When the hole location apparatus is registered with the opening O in the fixture 12, the probe means 22 is laterally or horizontally displaced in a positive direction along the Y-axis so as to register with the hole $H_8$. Displacement of the probe means 22 results in the boss 44 of the probe base 36 bearing against the lower end 76 of the second displaceable member 54, thereby shifting it vertically within the sleeve 80 toward the first and second chambers 88, 89.

The sensor 116 detects the displacement of the second displaceable member 54, the information being interpreted by the digital electronics package and displayed by the visual display 112. Because the lower end 76 of the second displaceable member 54 includes the surface 78 which has been beveled at an angle of 45°, the lateral displacement of the probe head 28 is converted by the displacement conversion means 24 into an equivalent vertical displacement of the second displaceable member 54.

Thus, it will be understood that the hole location apparatus 10 determines the displacement of the workpiece hole along the Y-axis in manner similar to that in which the displacement of the hole along the X-axis is calculated. Any displacement of the probe means 22 results in a corresponding displacement of the second displaceable member 54 as opposed to the first displaceable member 52. Similarly, the extent of the displacement of the second displaceable member 54 is determined by the sensor 116 as opposed to the sensor 114. If the workpiece hole has not been simultaneously displaced along the X-axis, the first displaceable member 52 sustains no movement.

FIGS. 16 and 17 illustrate the situation in which the workpiece hole has been formed in a location which is displaced in both a positive direction along the X-axis and a negative direction along the Y-axis relative to the desired location. The reference $H_9$ designates the desired location of the workpiece hole while the reference $H_{10}$ designates the actual location. It will be understood that the actual location $H_{10}$ comprises an X-axis component and a Y-axis component with respect to the desired location $H_9$. The hole location apparatus 10 according to the invention is adapted to simultaneously detect and display the displacement of the workpiece hole along both the X- and Y-axes.

The configuration assumed by the hole location apparatus in FIGS. 16 and 17 will be understood to be a combination of the configurations illustrated in FIGS. 13, 13A, 14 and 14A. That is, as the probe head 28 is laterally displaced in order to register with the workpiece hole, the boss 44 thereof bears against the beveled surface 66 of the first displaceable member 52 thereby shifting it vertically in a direction toward the first and second chambers 88, 89 of the sleeve 80. The end surface 58 of the first displaceable member 52 bears against the spring-loaded sensor 114 which determines the extent of the displacement of the first displaceable member. Because the surface 66 of the first displaceable member 52 is beveled at an angle of 45°, the lateral or horizontal displacement of the probe head 28 is converted by the displacement conversion means 24 to an equivalent displacement in the vertical direction. The extent of the displacement is determined by the sensor 114, is converted by the digital electronics package, and is thereafter displayed by the visual display 112. Thus, the X-axis component of the displacement of the workpiece hole is determined by the probe means 22 in combination with the first displaceable member 52 and the sensor 114.

Similarly, the Y-axis component of the displacement is detected by the second displaceable member 54. That is, as the probe means 22 is laterally displaced so as to be registerable with the workpiece hole, the second displaceable member 54 is shifted in a direction toward the lower end 82 of the sleeve or shaft 80 by the spring-loaded sensor 116. Because the surface 78 at the lower end 76 of the second displaceable member 54 has been beveled at an angle of 45°, the lateral displacement of the probe means 22 is equivalently converted to a displacement of the second displaceable member in a vertical direction. The sensor 116 determines the extent of the displacement of the second displaceable member 54, this information being converted by the digital electronics package and displayed by the visual display 112. The visual display 112 may in fact comprise a pair of separate and independent, first and second display panels 112a, 112b (FIG. 3), each being adapted to display, respectively, the displacement along the X- or Y-axis.

Although the hole location apparatus 10 has been described as indicating the displacement of a workpiece hole along the X- and Y-axes, the apparatus may be modified to provide variable data with regard to a third or Z-axis, which would be representative of the depth of the workpiece hole. A sensor similar to the sensors 114, 116 can be mounted to the exterior of the housing 110 and connected to the electronics package. The Z-axis sensor is adapted to bear against the fixture 12 adjacent to the workpiece hole and determine the extent or depth to which the conical tip 30 is received within the workpiece hole, which measurement may be interpreted by the electronics package and displayed for a user.

Thus, a user of the hole location apparatus 10 may quickly, readily and efficiently determine whether a hole that has been formed in a workpiece has been formed at the desired location. If it is determined that in fact the workpiece hole has been formed at a location other than the desired location, the hole location apparatus 10 is adapted to provide variable data indicating both the direction in which the displacement has occurred and the extent to which the hole has been displaced relative to the desired location. The user may then determine whether the actual location of the workpiece hole falls within the allowed tolerances for the same. The apparatus may also be used repetitively to provide variable data for a series of holes formed in the workpiece.

The invention has been described in connection with the preferred embodiments. It will be understood that this description is intended to illustrate, and not limit the scope of the invention which is defined by the following claims.

The embodiments for which an exclusive property or privilege is claimed are defined as follows:

1. A sensor for detecting the location of a hole in a surface of a workpiece, comprising a sensing head having a probe adapted to engage a portion of a workpiece surface defining a hole, a boss carried by said sensing head, a housing supporting said sensing head for lateral displacement in any direction from a longitudinal Z axis of said sensor in response to engagement of a hole-defining portion by said probe, said housing being a tubular member having an interior surface and a tubular chamber at one end thereof and said boss being freely laterally displacable within the limits of said housing, a pair of displacement conversion members supported in said housing for independent axial displacement relative thereto along said Z axis and constrained against lateral movement, the displacement conversion members having end surfaces in engagement with said boss and radiused surfaces engaging said interior surfaces of the tubular member, said end surfaces being adapted to cooperate with the boss to effect axial displacement of the displacement conversion members corresponding in direction and magnitude to lateral displacement of said sensing head along X and Y lateral axes respectively and said radiused surfaces laterally retaining said displacement conversion members, and a position indicator responsive to axial displacement of each of said conversion members to generate a signal indicative thereof.

2. A sensor according to claim 1, including a spring urging said sensing head to a position aligned with said longitudinal Z axis of said sensor, said spring having an end thereof attached to said boss and having another end thereof fixed relative to said housing.

3. A sensor according to claim 2, including separate spring means urging said displacement conversion members axially toward said boss.

4. A sensor according to claim 1, including a mounting member and at least one fastener for fixedly securing said mounting member to said housing, said displacement conversion members including side walls, said mounting member engaging said side walls to maintain said displacement conversion member radiused surfaces in contact with said tubular housing interior surface, whereby said mounting member prevents circumferential movement of said displacement conversion members within said tubular housing.

5. A sensor according to claim 4, wherein said mounting member includes means for maintaining said displacement conversion members in circumferentially spaced relation.

6. A sensor according to claim 5, wherein said displacement conversion members having sloping end surfaces, said mounting member being adapted to maintain said sloping end surfaces ninety degrees out of phase with one another.

7. A sensor according to claim 5, wherein each displacement conversion member is substantially triangular in cross section and has an end wall in addition to said arcuate surface and said side wall thereof, said end wall and side wall being substantially flat.

8. A sensor according to claim 7, wherein the configuration of each displacement conversion member in cross section is a mirror image of the other displacement conversion member in cross section.

9. A sensor according to claim 5, including a first spring having opposite ends, one of said ends being secured to said sensing head and the other of said ends being secured to said mounting member.

10. A sensor according to claim 1, wherein said sensing head includes an upper surface in continuous engagement with a portion of said tubular chamber defining an opening, thereby sealing said opening.

* * * * *

UNITED STATES PATENT AND TRADEMARK OFFICE
CERTIFICATE OF CORRECTION

PATENT NO. : 5,168,638

DATED : December 8, 1992

INVENTOR(S) : DAVID W. BARTON

It is certified that error appears in the above-identified patent and that said Letters Patent is hereby corrected as shown below:

Claim 6, Column 16, line 4, please delete the word "having" and substitute therefor --have--.

Signed and Sealed this

First Day of February, 1994

Attest:

BRUCE LEHMAN

Attesting Officer

Commissioner of Patents and Trademarks